Dec. 1, 1964 G. S. LAWSON 3,159,427
HEAD REST ASSEMBLY
Filed Nov. 19, 1962 2 Sheets-Sheet 1
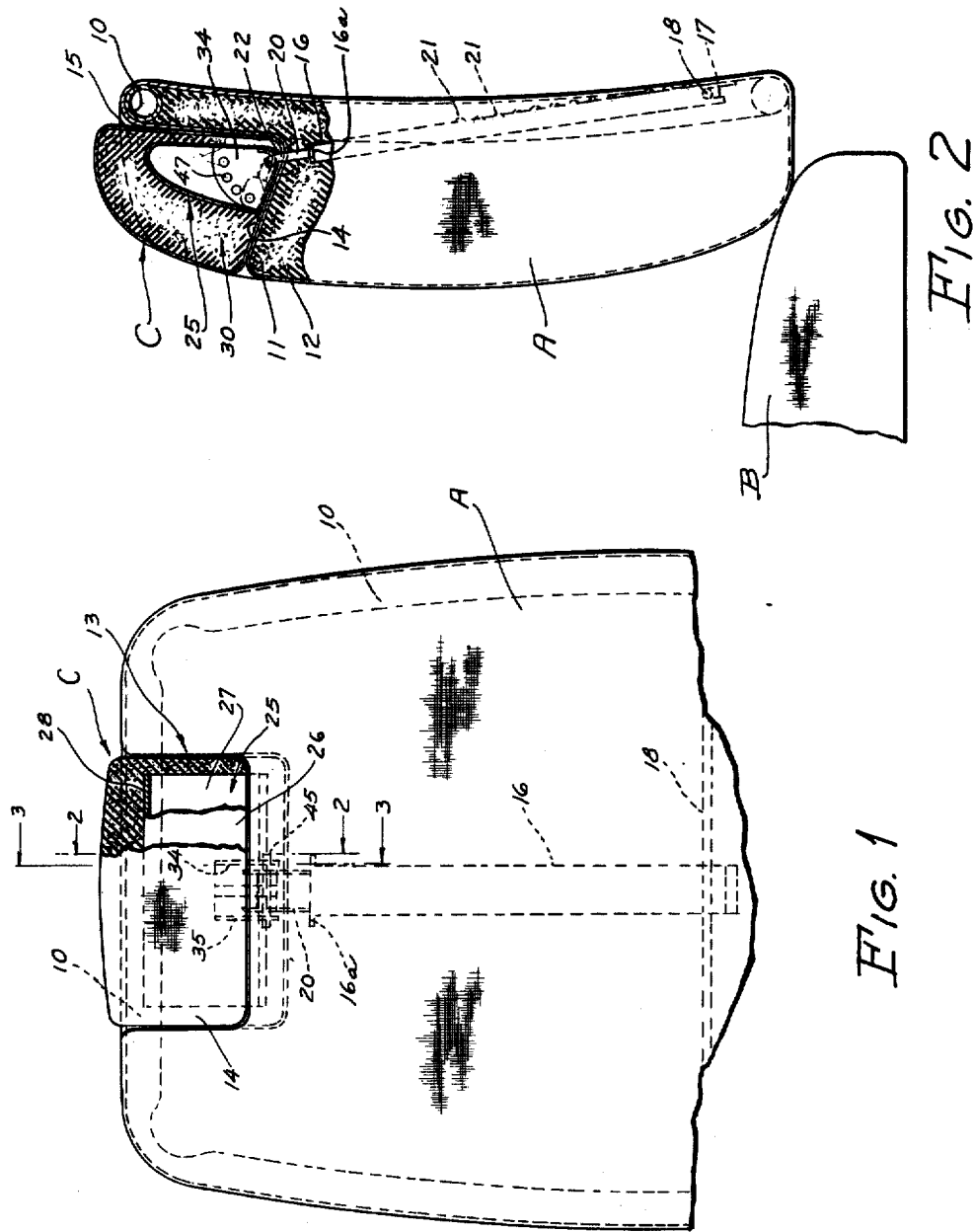
INVENTOR.
GEORGE S. LAWSON
BY
Carl J. Barbee
ATTORNEY

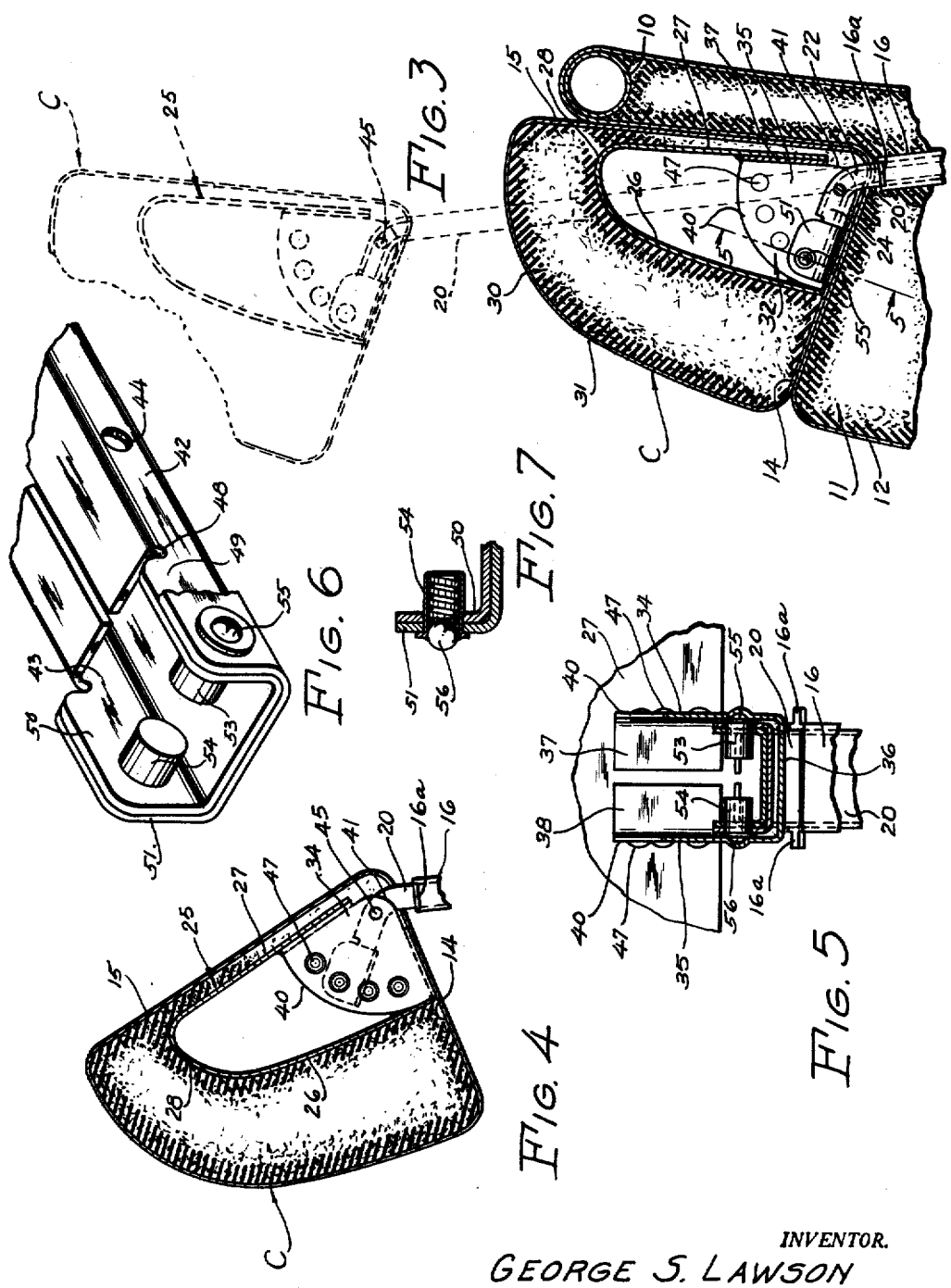

3,159,427
HEAD REST ASSEMBLY
George S. Lawson, Mount Clemens, Mich., assignor to American Motors Corporation, Kenosha, Wis., a corporation of Maryland
Filed Nov. 19, 1962, Ser. No. 238,659
7 Claims. (Cl. 297—410)

The invention relates to a headrest assembly and its associated seat back rest.

The invention contemplates a headrest assembly which is housed in a pocket formed in the seat back rest to provide a generally flush surface when not used in extended position. This feature serves to discourage detachment of the headrest from the seat back rest at any time.

The adjustable features of the headrest assembly render it suitable for use by people of any physical configuration and permit a greater range of uses of a seat back of the reclining type.

The invention has further reference to a headrest assembly which has a greater range of adjustability than headrest assemblies of the prior art.

The principal object of the invention, then, is to provide a combination headrest assembly and seat back rest with generally improved features.

Another object is to provide a headrest assembly which is recessed into the seat back rest when in fully retracted position.

Another object is to provide a headrest assembly with structural details permitting an improved range of fore and aft adjustment and also achieving manufacturing cost reductions.

Other objects and advantages of the invention will be apparent from the ensuing specification and appended drawings in which:

FIGURE 1 is a front view of a vehicle seat back rest with the headrest assembly shown partially in section.

FIGURE 2 is a side elevational view of the seat back rest of FIGURE 1 with the headrest assembly and a portion of the seat back rest being shown in section.

FIGURE 3 is an enlarged fragmentary sectional detail view taken on the line 3—3 of FIGURE 1 and including a dotted line showing of the headrest assembly in extended position.

FIGURE 4 is an enlarged fragmentary sectional detail view of the headrest assembly taken on the line 2—2 of FIGURE 1 with the pillow assembly adjusted to a different position of fore and aft adjustment.

FIGURE 5 is an enlarged fragmentary sectional detail view taken on the line 5—5 of FIGURE 3.

FIGURE 6 is an enlarged fragmentary detail perspective view of the uppermost end of the headrest supporting stem.

FIGURE 7 is an enlarged fragmentary sectional detail view.

Referring to FIGURES 1 and 2, I have shown a vehicle seat back rest A and a portion of a seat cushion B. The headrest assembly C is carried by the seat back rest for up and down adjustment with reference thereto. The headrest assembly is also capable of fore and aft adjustment relative to its supporting stem as will be explained more fully hereinafter.

The seat cushion and seat back rest may be of the usual construction employed in an automotive vehicle except for that portion of the seat back rest which accommodates the headrest assembly. In general, the seat back rest may include a principal frame member 10 which defines the outline of the back rest and provides the support for carrying the cross wires and springs (not shown) which make up the interior thereof. Suitable padding, such as foam rubber 11, may be used in conjunction with the springs and a fabric 12 serves as the covering for the entire seat back rest.

The seat back rest is provided with a centrally situated pocket identified generally by the numeral 13, the cross sectional configuration of which may simulate the cross sectional configuration of the bottom and rear walls 14 and 15 of the headrest assembly, as best shown in FIGURES 2 and 3.

The headrest assembly is carried by the seat back rest for up and down adjustment with reference thereto. A tubular column 16, generally rectangular in cross section, may be provided at its lower end with a slot 17 which engages the cross wire 18. The headrest assembly is carried on a tubular stem 20 which is telescopically received in the column for up and down adjustment with reference thereto. The column is provided with detents 21 with which a spring pressed ball on the stem (not shown) coacts to provide selective positions of up and down adjustment of the stem 20 with reference to the column. This structure is conventional and is shown in Patent No. 3,027,194. The column 16 may be provided with flanges 16a for attachment to some portion of the seat back frame (not shown) so that the column is stationary with reference to the seat back rest. The upper end of the stem 20 is bent at 22 resulting in the angularly inclined end portion 24.

In the construction of the pillow assembly, the principal frame member, identified generally by the numeral 25, is in the form of a U-shaped stamping fabricated from a flat piece of sheet metal to provide a front wall 26, a rear wall 27 and an interconnecting web portion 28. Suitable elastic padding material 30, such as foam rubber, surrounds the outer wall surface of the stamping 25 to form the pillow portion of the head rest. A fabric covering 31 (which can match the upholstery material covering the seat back rest) covers the exterior of the head rest pillow. The interior of the stamping 25 is hollow and accommodates the bracket device which coacts with the upper end of the support stem 20, as will be explained more fully hereinafter.

The bracket device, identified generally by the numeral 32, is situated substantially centrally of the stamping 25 lengthwise (as best indicated in FIGURE 1). It may be formed from a single piece of sheet metal having opposed side walls 34 and 35 interconnected by the web portion 36, each of said side walls having an inwardly turned flange portion 37 and 38 respectively. The flanges are rigidly anchored to the rear wall 27 of frame member 25 as by means of welding. Each of the side walls is formed in the nature of a quadrant having an arcuate outer edge 40 and a reversely arcuate inner edge 41. The web portion 36 and the flanges 37 and 38 terminate short of the apex of the quadrants so as to provide an open area through which the stem 20 projects.

The side walls 42 and 43 of the head rest supporting stem are provided with openings 44 (see FIGURE 6) which are aligned with appropriate openings in the bracket side walls 34 and 35. Pivot pin 45 extends through the aligned openings thereby providing for swinging movement of the pillow assembly relative to the upper end of the supporting stem about the axis of the pin. Each of the bracket side walls 34 and 35 are provided with a series of detents 47 arranged in a circumferential path with reference to the axis of pin 45. The uppermost end of the stem 20 is slotted at 48 (see FIGURE 6) to permit the side flanges 49 and 50 to be formed as continuations of the side walls 42 and 43, thereby forming a U-shaped or channel shaped end portion for the stem 20. An additional U-shaped bracket 51 is rigidly secured to and embraces the end portion of the stem to provide additional rigidity and adequate support for the cylinders 53 and 54 which house the spring pressed balls 55 and 56, as best shown in FIGURE 7. Each of the spring pressed balls, of course, coact with the detents in the bracket side walls for resiliently holding the head rest in a pre-selected position of fore and aft adjustment of the pillow assembly relative to the upper end of support stem 20. The web 36 and the flanges 37 and 38 serve as the stops for limiting the fore and aft adjustment of the pillow assembly relative to its supporting stem about the axis of pin 45.

Viewing FIGURES 3 and 4, it will be noted that the cross sectional configuration of the pillow assembly is generally cam shaped so that the head accommodating portion thereof extends more forwardly in order to contact the back of the head.

I claim:

1. A head rest assembly for use with a vehicle seat back rest comprising: a stem carried by and interiorly of the seat back rest and projecting exteriorly therefrom at the upper end thereof; a pillow assembly carried on the upper end of the stem and including a rigid skeleton in the form of a U-shaped stamping extending throughout a major portion of the length of the pillow assembly; said stamping having spaced forward and rearward walls interconnected at their upper ends by the web of the U; a human head accommodating pillow in the form of a resilient padding surrounding the stamping and secured thereto; a flexible covering surrounding the padding and encasing the pillow; the pillow covering having an opening at the underside communicating with the area between the stamping walls; the upper end of the stem projecting through the covering opening into the interior of the pillow assembly; a bracket situated interiorly of the pillow assembly between the walls of the stamping and being rigidly secured thereto, the bracket being pivotally mounted on the upper end of the stem, and means on the upper end of the stem and interengaging with the bracket for effecting selective positioning of the pillow assembly relative to the stem about the axis of the pivotal mounting.

2. Apparatus as set forth in claim 3 wherein the stem is in tubular form and wherein the end of the stem is U-shaped in cross section to provide flanges for mounting the additional means thereon.

3. A head rest assembly for use with a vehicle seat back rest comprising: a stem carried by and interiorly of the seat back rest and projecting exteriorly therefrom at the upper end thereof; a pillow assembly carried on the upper end of the stem and including a rigid skeleton in the form of a U-shaped stamping extending throughout a major portion of the length of the pillow assembly; said stamping having spaced forward and rearward walls interconnected at their upper ends by the web of the U; a human head accommodatting pillow in the form of a resilient padding surrounding the stamping and secured thereto; a flexible covering surrounding the padding and encasing the pillow; the pillow covering having an opening at the underside communicating with the area between the stamping walls; the upper end of the stem projecting through the covering opening into the interior of the pillow assembly; a bracket situated interiorly of the pillow assembly between the walls of the stamping and being rigidly secured thereto, said bracket having side walls extending transversely with reference to the forward and rearward walls of the stamping and said side walls being spaced from each other; a web portion interconnecting the bracket side walls; said bracket being pivotally mounted on the upper end of the stem; means provided on the bracket side walls and additional means provided on the upper end of the stem for coacting with the side wall means to effect selective positioning of the pillow assembly relative to the stem.

4. A head rest assembly for use with a vehicle seat back rest comprising: a stem carried by and interiorly of the seat back rest and projecting exteriorly therefrom at the upper end thereof; a pillow assembly carried on the upper end of the stem and including a rigid skeleton in the form of a U-shaped stamping extending throughout a major portion of the length of the pillow assembly; said stamping having spaced forward and rearward walls interconnected at their upper ends by the web of the U; a human head accommodating pillow in the form of a resilient padding surrounding the stamping and secured thereto; a flexible covering surrounding the padding and encasing the pillow; the pillow covering having an opening at the underside communicating with the area between the stamping walls; the upper end of the stem projecting through the covering opening into the interior of the pillow assembly; a bracket situated interiorly of the pillow assembly between the walls of the stamping and being rigidly secured thereto, said bracket having side walls extending transversely with reference to the forward and rearward walls of the stamping and said side walls being spaced from each other; a web portion interconnecting the bracket side walls; said bracket being pivotally mounted on the upper end of the stem; detents formed on the side walls and arranged in a circumferential path relative to the axis of the pivotal mounting and additional means provided on the upper end of the stem for coacting with side wall detents to effect selective positioning of the pillow assembly relative to the stem.

5. A head rest assembly for use with a seat back rest comprising: a stem carried interiorly of the seat back rest and projecting exteriorly therefrom at the upper end thereof; a pillow assembly carried at the upper end of the stem; said pillow assembly including:

(a) an elongated rigid skeleton in the form of a U-shaped stamping having a forward wall and a rearward wall spaced therefrom to provide a hollow interior between such walls, said walls being interconnected at their upper ends by the web of the U;

(b) a resilient padding surrounding the skeleton and being secured thereto to form a human head accommodating pillow;

(c) a flexible covering surrounding and encasing the pillow;

a bracket positioned between the forward and rearward walls of the stamping adjacent the lower marginal edges of the forward and rearward walls and being anchored thereto; said covering having an opening therein at the under side of the pillow; the upper end of the stem projecting through the opening in the covering into the interior of the pillow assembly; said bracket being pivotally mounted on the upper end of the stem; means on the bracket and additional means on the upper end of the stem for coacting with the bracket means for releasably holding the pillow assembly in a selective position of adjustment relative to the stem about the axis of the pivotal mounting.

6. Apparatus as set forth in claim 3 wherein the web portion of the bracket terminates short of the bracket side walls and the stem is engageable with bracket web for limiting movement of the pillow assembly in one direction about the axis of the pivotal mounting.

7. Apparatus as set forth in claim 4 wherein the bracket side walls have inwardly turned flanges anchored to the rear wall of the stamping and said flanges terminate short of the bracket side walls, said bracket having an opening formed between the termini of the flanges and the bracket web, said stem projecting through the bracket opening.

References Cited in the file of this patent

UNITED STATES PATENTS

| | | |
|---|---|---|
| 1,717,568 | Koenigkramer | June 18, 1929 |
| 2,828,810 | Barecki et al. | Apr. 1, 1958 |
| 2,917,109 | Marsh | Dec. 15, 1959 |
| 3,027,194 | Rumptz | Mar. 27, 1962 |